3,179,587
CELLULOSE CRYSTALLITE AGGREGATES IN CHROMATOGRAPHICAL ADSORPTION
Orlando A. Battista, Drexel Hill, and John J. Byrne, Jr., Prospect Park, Pa., assignors, by mesne assignments, to FMC Corporation, San Jose, Calif., a corporation of Delaware
No Drawing. Filed Feb. 19, 1960, Ser. No. 9,675
12 Claims. (Cl. 210—31)

This invention relates to column chromatography, and particularly to an improved adsorbent material for use in the column.

As is known, column chromatography is of general application to such procedures as the separation of mixtures, the purification of substances, the concentration of materials from solution, and the like. For example, in the case of a mixture to be resolved into its individual constituents, the mixture may first be dissolved in a solvent and the resulting solution introduced to the column, the solvent passing down through and leaving a quantity of the mixture in the upper portion. Then the column is washed with several portions of a solvent or eluant in order to develop the chromatogram; in other words, the effect of the solvent additions is to move the mixture, or rather the constituents thereof, down the column. The rate of travel through the column is specific for each constituent, it being desirable, of course, that the rates be as different as possible from one another as it is on this basis that a separation of the constituents can be made. In a preferred method, the solvent additions are made continuously rather than in successive batches, and the effluents of the column are collected in a series of containers or fractions, each fraction being collected over a definite period of time and then being replaced by a succeeding container.

The constituents that make up the mixture will be found scattered through the fractions in admixture with the solvent. Thus, one constituent may be present in one or a plurality of successive fractions; another constituent may be found in the next group of fractions which may comprise one or a plurality of successive fractions; and so on. The constituents may be recovered simply by evaporating away the solvent.

As may be apparent, the separation of the mixture into its constituents depends on several conditions, one of the most important of which is the adsorbent material in the column.

A principal object of the invention is to provide an improved adsorbent for column chromatography in the form of cellulose crystallite aggregates, a product obtained by the acid hydrolysis of cellulose, there being formed an acid-soluble portion and an acid-insoluble portion. The latter comprises a crystalline residue or remainder; it is washed and recovered, being referred to as cellulose crystallite aggregates, or as level-off D.P. (degree of polymerization) cellulose.

Among other advantages, the cellulose crystallite aggregates exhibit a unique capacity for absorbing and adsorbing chemical compounds. Of particular interest is the fact that the crystallite aggregates have the property of selectively absorbing hydrophobic or oleaginous materials. Also of importance in this connection is the presence of numerous small cracks and fissures on the surfaces of the crystallite aggregates. The aggregates are particularly characterized by their high purity, by virtue of which they are remarkably free of any tendency to contaminate materials brought into contact with them, particularly pharmaceuticals and delicate biochemicals like enzymes. Still another advantage of the aggregates resides in their controllable particle size and particle size distribution, that is to say, the particle size and size distribution are reproducible from one batch to another and can be varied at will over wide ranges of sizes and size distributions.

Referring in more detail to the preparation of the crystallite aggregates by acid hydrolysis, it may be explained that the acid dissolves amorphous portions of the original cellulose chains, the undissolved portions being in a particulate, non-fibrous or crystalline form as a result of the disruption of the continuity of the fine structures between crystalline and amorphous regions of the original cellulose. Although hydrolysis may be effected by various specific methods, a direct method which is free of secondary reactions, and which is employed in the present invention, comprises the treatment of the original cellulosic material with 2.5 normal hydrochloric acid solution for 15 minutes at boiling temperature. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight, rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average length, or of average level-off D.P. values.

The hydrolysis method noted above is particularly characterized in that in each crystallite aggregate resulting from the hydrolysis, no constituent chain is connected to a chain in a neighboring aggregate; rather, all the chains in an aggregate are separate from and free of those in neighboring aggregates.

The cellulose crystallite aggregates, or level-off D.P. cellulose, suitable for use in the invention is characterized by having a preferred average level-off D.P. of 125 to 375. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the level-off D.P. cellulose, or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance with the first preference noted above, at least 85% of this material will be made up of chains containing 50 to 550 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the non-cellulose components of the orginal material are so effectively destroyed that their concentration is reduced to a very low level. Of interest is the fact that the chains produced by the hydrolysis each have on one end thereof a potential aldehyde group, such group being in the 1 carbon position of an end anhydroglucose unit and requiring the assistance of the ring oxygen atom, which is ortho to it, to realize its aldehydic potential. The group has the reducing properties of an aldehyde group.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level off D.P. of 125 to 175, at least 90% of which is in the range of 50 to 450.

The aggregates are used in finely divided form, preferably having a particle size ranging from less than 1 micron to 250 to 300 microns. Within the foregoing range, the particle size and size distribution are variable, it being understood that with a particular separation system, the particle size and size distribution will be correlated to the ease of throughput of the eluting solvent and the separation efficiency. It may, however, be noted that a preferred aggregate material is one comprising, at least in part, particles having one or two dimensions of a size ranging up to, say, 100, 200, 250, or 300 microns. As an example, the crystallite aggregate material may have a particle size in the range of 40 to about 250 microns. Such a material may be prepared by subjecting the product of acid hydrolysis to mechanical disintegration to produce a material having a size in the range of less than 1 to about 250 or 300 microns, and then fractionating such product as by mechanical sifting, or by settling in water, the larger particles settling to a greater extent than the smaller. Larger particles are of interest because of the finding that such particles, particularly those having one or two dimensions of up to 100 to 250 or 300 microns, tend to have cracks, fissures, notches, and the like in their surfaces.

Mechanical disintegration of the aggregates, as referred to above, may be carried out in several ways, as by subjecting them to attrition in a mill, or to a high speed cutting action while suspended in an aqueous medium, or to the action of high pressures on the order of at least 5,000 or 10,000 p.s.i. These disintegration procedures may be carried out to such an extent that the resulting disintegrated aggregates are characterized by forming a stable dispersion when dispersed in an aqueous medium, that is, a dispersion from which the aggregates will not settle out but will remain dispersed indefinitely; furthermore, such aggregates are additionally characterized by forming a gel when the amount of aggregates dispersed in the aqueous medium is, preferably, about 3% or more by weight of the dispersion. Crystallite aggregates that have been mechanically disintegrated as indicated comprise a preferred material for use in the invention. Even more preferred are aggregates formed by subjecting gels of the kind described to drying, particularly spray drying or freeze drying, and then recovering the resulting solids, the latter being useful per se or after breaking them sufficiently to obtain a free-flowing powder. Freeze drying, in particular, favors the development of a very porous material characterized by the presence in the aggregates of a multiplicity of pores or depressions of extremely small size. It is also possible to mechanically disintegrate the aggregates to an extent more restricted than that described, as by simple crushing, such that the resulting material does not form a stable aqueous dispersion, or a gel, but which nevertheless is suitable for use in the invention. Also of value are the aggregates as produced by the acid hydrolysis, which have not been subjected to mechanical disintegration.

The moisture content of the aggregates is generally less than 15%, preferably less than 8 to 10%, and more preferably less than 5%. The moisture content may also be above 15%, going up to, say, 25, 30, 40, or 50%.

It is also possible to use crystallite aggregates having lower average level-off D.P. values, say in the range of 60 to 125, or even 15 to 60. Aggregates from both of these ranges have the chemical purity, moisture content, particle size, and other characteristics noted above. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

As obtained from the acid hydrolysis and water washing steps, the aggregates in the over-all average level-off D.P. range of 15 to 375 are in a loosely aggregated state and, as indicated, are characterized by the presence of many cracks in their surfaces, including similar surface irregularities or phenomena like fissures and notches. Because of such irregularities the apparent or bulk density of the aggregates is much less than their absolute density. Furthermore, the cracks, etc. persist despite the application of high compressive forces on the aggregates. Thus when they are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i. it is 1.38 and 1.38, respectively. On the other hand, the absolute density of a unit crystal or crystallite is 1.55, from which it is apparent that the aggregates occlude considerable quantities of air in the surface cracks and fissures.

The cellulose crystallite aggregates are generally useful in separation procedures based on chromatographic adsorption. Not only may mixtures be resolved into their components, but one substance may be separated from another or from a plurality of substances, and similarly, two or more substances may be separated from one or from a plurality of substances.

The following examples may illustrate the use of the crystallites for the separation of a mixture into its components:

*Example 1*

A slurry was formed by dispersing cellulose crystallite aggregates in a solvent prepared from 1 volume of butanol, 2 volumes of isopropanol, and 1 volume of 1 N HCl. The aggregates had an average level-off D.P. of 220, a purity above 96%, a moisture content of about 5%, and a particle size in the over-all range of below 1 to 250 microns, of which about 10% had a size below 44 microns, about 40% had a size in the range of 44 to 74 microns, and 40 to 50% were above 74 microns.

The slurry (which provided a convenient way of placing the aggregates in the column, although they could also be introduced thereinto in dry form) was then carefully poured down the side of a glass column 46 cm. long having an internal diameter of 2.5 cm., care being exercised not to produce channeling or air pockets in the material. A previously introduced disc of fritted glass supported the aggregates in the column. As solvent drained from the column, additional quantities were added to the top so as to maintain excess solvent at the top. When the aggregates did not settle any further, the solvent was allowed to drain.

Then a mixture of amino acids was prepared comprising 100 mgs. each of aspartic aicd, histidine, and cysteine. These were dissolved in water and the resulting solution made up to a volume of 100 ml. It was designated the stock solution. About 30 ml. of such stock solution were added to the top of the column, and at the same time an automatic fraction collector containing fifty 10 ml. test tubes was placed in position at the bottom of the column to receive effluents. All of the stock solution was added to the column in 30 ml. portions, and thereafter the butanol isopropanol-HCl solvent was allowed to drip continuously into the top of the column and to pass therethrough. The solvent did not dissolve the amino acids under the conditions employed but served to aid their flow through the column at different rates, thus developing the chromatogram. After 4 to 5 hours, all of the samples were collected, and then a Feigl spot test was made to ascertain the efficiency of separation of the amino acids. Whatman filter paper, No. 1, was sprayed with a 2% solution of ninhydrin (triketohydrindene), and the paper was oven dried at 105° C. for 5 minutes. Two drops from each fraction were spotted on the dried paper in numerical order over a series of spaced locations, after which the paper was again oven dried at 105° C. for 5 minutes. It was found that the first amino acid usually emerged from the column after a number of test tubes were collected. Each of the amino acids gave a distinctive color on the Whatman filter paper, the colors being well spaced from each other along the paper. As will be understood, the colors develop by reaction between the ninhydrin and the amino acid. The test tubes containing the amino acids were set aside and their contents analyzed for nitrogen, with the following results:

| Sample No. According to Spot Test | Amine Acid | Percent Nitrogen |
|---|---|---|
| 6 | Aspartic | 0.06 |
| 25 | Histidine | .05 |
| 35 | Cysteine | .04 |
| Control | None | .00 |

The ninhydrin reagent was prepared by dissolving 2 grams thereof in 50 ml. of water and then adding to the resulting solution a mixture of 80 mg. of stannous chloride in 50 ml. of water. The mixture was allowed to stand in the dark for 24 hours, after which the precipitate was removed by filtering, leaving the stock solution of ninhydrin.

Example 2

Air-dried Ketchikan wood pulp in an amount of 0.3 g. was hydrolyzed to sugars by means of sulfric acid according to the conventional procedure described in "Manual on Chromatographic Methods—Analyses of Purified Pulps by Quantitative Paper Chromatography (March 25, 1957)," by J. F. Saeman, Forest Products Laboratory, U.S. Dept. of Agriculture, Madison 5, Wisconsin. After neutralization and concentration, there was obtained 15 ml. of an aqueous sugar solution whose sugar content was as follows: 95.66% by weight of glucose, 2.86% mannose, and 1.48% xylose.

A column of cellulose crystallite aggregates was prepared using the aggregates and the procedure described in Example 1, except that the aggregates had a particle size in the range of 40 to 250 or 300 microns. The solution of the sugars was poured into the top of the column and allowed to passed downwardly therein. While some of the sugar solution was still present above the level of the adsorbent, several portions of an eluant were added comprising a 9:1:1 mixture (volume ratio) of ethyl acetate, acetic acid, and water. Thereafter the eluant was allowed to drip continuously into the column. A total of 45 fractions of 10 ml. each were collected. Sugar was detected in the 13th, 14th, and 15th fractions by means of the conventional Vogel spot test. The 14th fraction was evaporated down to about 1 ml., and xylose was identified by a standard paper chromatographic test method for the quantitative identification of sugars, as described in the Saeman reference noted above. None of the other 45 fractions were found to contain any sugar, it thus being apparent that the glucose and mannose were retained in the column. As was also apparent, the column had separated the sugar present in the lowest concentration from the other two.

Example 3

The following columns of adsorbent materials were prepared: (1) cellulose crystallite aggregates of the kind employed in Example 1; (2) cellulose crystallite aggregates of the kind used in Example 1 except that they had a size less than 44 microns; (3) a commercial adsorbent material comprising conventional fibrous cellulose that had been ground to an average particle size which was greater than 200 mesh and which had a moisture content in the range of 6 to 7% by weight; (4) a commercially used adsorbent comprising conventional cellulose acetate fibers whose diameter corresponded with that of an acetate fiber of 8 denier per filament (about 30 microns diameter). Then a mixture was made up by adding about 0.5 gram of oil-soluble black ink to 100 grams of cottonseed oil. The oil-ink mixture was added to the top of each of the four columns and allowed to move downwardly by gravity. One ml. of the mixture was added to each of the columns except column (1), which exhibited such slow penetration of the mixture that only 0.1 ml. could be added initially. However, after about 1¾ hours, a total of 0.8 ml. was added to column (1). As the test progressed, it became evident that column (1) had the slowest downward movement by far of the oil mixture; this was attributed to the very high absorption of the mixture on the adsorbent material. Column (1) also showed the smoothest partition separation of the components of the mixture, there being present a number of bands ranging from light grey at the bottom of the column to black at the top of the column. Column (2) exhibited a faster penetration by the oily mixture than was the case with column (1), and the separation into bands was quite uniform. In the case of columns (3) and (4), channeling occurred, and the efficiency of separation was judged to be definitely inferior to that observed with either column (1) or (2).

Example 4

Three columns of adsorbent materials were made up: Nos. 1 and 2, which were the same as Nos. 1 and 2 of the preceding example, and No. 5, comprising conventional fibrous cellulose which was the same as No. 3 of the preceding example except that it had been ground to pass through a 325 mesh screen. A commercial blue writing ink was added to the top of each column in equal amounts and was allowed to percolate therethrough for about 72 hours. Upon examination, columns Nos. 1 and 2 both showed separation of the components of the ink, there being present a number of bands ranging from light blue in the bottom of the column to a dark blue at the top. Both Nos. 1 and 2 exhibited very sharp and level borders between the various bands and showed no evidence of channeling. Column No. 3 had marked channeling, and while there was some separation of the ink into bands, they were not sharply defined, and the borders between bands were distorted, part of each band extending into the bands above and below it.

Example 5

The following four columns of adsorbent materials were prepared: No. 6, comprising the same material as No. 1 of the preceding example except that it had been given an ethanol wash and was air-dried; No. 7, which was the same as No. 1 except that it comprised particles which did not pass through a 200 mesh screen, in other words, the particles had a size of 74 microns and greater, going up to 250 microns; No. 8, which was also the same as No. 1 except that it comprised particles which passed through a 200 mesh screen, i.e., particles of a size below 74 microns; and No. 9, which was the conventional fibrous cellulose of No. 3 having particles larger than 200 mesh. Then 4 ml. of Burnett's red food coloring dye was taken and diluted with water to 20 ml.; similarly, 4 ml. each of Burnett's yellow dye and blue dye were taken and each diluted to 20 ml. Then the three diluted dyes were mixed and made up to a total of 100 ml., forming a composite mixture of the dyes. Twenty ml. of the mixture were added to the top of each column. After 96 hours, columns Nos. 6, 7 and 8 had each separated the dye mixture into a lower band of blue, a band of green above the blue, and a brownish band above the green. Column No. 6 also showed a reddish band above the brown and a still darker band above the red. It was apparent that the original yellow and blue dyes had combined to form green. Channeling occurred with column No. 9, and although a separation of the colors took place, the efficiency of separation was inferior to that of the other columns, the borders between bands being less distinct.

Example 6

A 0.5% by weight solution of an oil-soluble yellow dye, Parakeet yellow No. 6, in cotton seed oil was prepared and the resulting yellow solution was poured into the top of a column containing crystallite aggregates of the kind used in column No. 1 of Example 1. After the solution had passed down into the column, two bands were apparent, a very wide lower band having substantially the color of the cotton seed oil, and a narrower upper yellow band in which the yellow dye had concentrated. The separation between the two bands appeared to be quite sharp and complete. It was clear from mere visual observation that the aggregates had absorbed the oil away from the dye, even though the latter was soluble in the oil; or to state it another way, the aggregates were shown to be effective for decolorizing the oil.

Example 7

The following columns of adsorbent materials were prepared: three columns of the crystallite aggregates used in column No. 1 of Example 1, a column of the aggregates used in No. 2 of Example 3, a column of the conventional ground-up fibrous cellulose used in column No. 3 of Example 3, and a column herein identified as No. 10 which contained silica gel comprising particles that were retained on a 200 mesh screen. An aqueous mixture of Burnett's water-soluble vegetable dyes comprising Parakeet green, yellow and red was prepared and poured into the top of each of the columns. The concentration of each of the three dyes in the aqueous solution was about 0.5% by weight. After the dye solution had percolated through each column, the following bands were observed in the case of the four columns containing the crystallite aggregates: the lowest band was yellow of a narrow width; above it was a slightly wider band of red; above the red was a pink band of approximately the same width; above the pink was a very wide green-gray band; then came a very wide band of dark green, and at the top of the column there was a narrow black band. The separations between the foregoing bands was quite sharp. By contrast, the columns of conventional fibrous cellulose and silica gel showed very little separation of the dyes into distinct bands and channelling was present.

In other preferred methods, instead of removing adsorbed materials from the column by flowing a solvent or eluant therethrough, each band or zone of adsorbed material and adsorbent may be separately removed from the column in order and the adsorbed material recovered therefrom by means of a suitable solvent, the resulting solutions then being filtered to remove solid adsorbent, and the solvent evaporated away leaving the separated material. Alternatively, the adsorbent with adsorbed material thereon may be removed from the column as a moist cylinder and cut into sections, each section corresponding to a band of adsorbent plus adsorbed material, and the latter may then be removed by means of a solvent, as described.

Illustrative of other separations that are contemplated is the isolation of hormones, such as stilbestrol, from natural sources containing them; the separation of unsaturated fatty acids as they occur, say, in corn oil or cotton seed oil, from saturated fatty acids, for example, stearic acid may be separated from oleic acid; or the separation of individual unsaturated fatty acids from one another. Of particular importance is the separation of amino acids, whether contained in various natural mixtures or produced by the degradation of casein, collagen, gelatin, and other protein materials as by hydrolysis with dilute acid or proteolytic enzymes. Other separations include alkaloids from plants; dyes from natural sources, and from each other; sterols and related compounds from natural products; the separation of isotopes. Blood may be separated into at least some of its constituents. Also contemplated is the recovery of vitamins from natural mixtures in which they are present; for example, such a mixture, after appropriate preliminary treatment, may be dissolved, as in petroleum ether, poured into the column, after which petroleum ether or methanol or other suitable solvent may be used to elute the vitamin. In this general way, vitamin A may be recovered from a source like animal livers, vitamin D from fish liver oils, tocopherols from cereal germ oil, vitamin $B_2$ from milk products, etc. Vitamins may not only be isolated but also purified, as may pharmaceuticals and chemical compounds in general. The cellulose crystallite aggregates are further suitable for deodorizing and/or decolorizing a host of commercial products, including foods and ingredients of foods.

It will be understood that the various separations are brought about by operation of the mechanisms of adsorption and/or absorption, which for convenience may be referred to as sorption actions or mechanisms, and which, of course, are dependent on the solvents and eluants employed. In general, it is usually an advantage that the mixture to be resolved shall be dissolved in a saturated hydrocarbon like hexane, heptane, petroleum ether, and the like. Other solvents are cyclic hydrocarbons like cyclohexane; and aromatic hydrocarbons, esters, chlorinated hydrocarbons, alcohols, acids and bases.

The constituents of the resolvable mixture should be easily soluble in the eluant. The latter, of course, should not react with the crystallite aggregates or the constituents of the mixture. Generally speaking, suitable eluants are alcohols, ethers, chlorinated hydrocarbons, and aromatic hydrocarbons. In general, too, liquids more polar than the adsorbed constituents will displace the latter from the crystallite aggregates. Preferably the eluant comprises a mixture of at least two solvents of varying solvent power for the adsorbed materials, at least one of the solvents being poorer than the others, that is, has less solvent power for the adsorbed materials than the others.

Although the foregoing description refers to the separation of solutions, it will be understood that these may include either true solutions, or colloidal solutions or dispersions which do not show particulate matter when examined under the microscope. The term "particulate matter" refers to the presence of separate particles in the solution. In a broader sense, the invention is also applicable to colloidal dispersions which do show particulate matter under the microscope, and to the separation of emulsions, whether stable or not.

Although the invention has been described in connection with specific embodiments of the same, it will be understood that it is capable of obvious variations without departing from its scope.

In the light of the foregoing description, the following is claimed:

1. In a process for chromatographically separating a mixture wherein said mixture is introduced to an adsorbent and passed therethrough, the improvement comprising employing cellulose crystallite aggregates as said adsorbent, said aggregates comprising the acid-insoluble crystalline residue of the acid hydrolysis of cellulose and being characterized by the uniformity of the lengths of the constituent chains thereof, said aggregates having an average level-off D.P. in the range of 15 to 375 anhydroglucose units, the constituent chains of each aggregate being separate from and free of those in neighboring aggregates, said aggregates being further characterized by having a sharp X-ray diffraction pattern indicative of a particulate, non-fibrous substantially crystalline structure, and by having a chemical purity of at least 95% and an ash content of less than 100 p.p.m.

2. In a process for chromatographically separating a mixture wherein said mixture is brought into contact with an adsorbent, the improvement comprising employing as said adsorbent particulate, non-fibrous cellulose crystallite aggregates having an average level-off D.P. of from 15 to 375 anhydroglucose units.

3. The process of claim 1 wherein said aggregates are derived from the HCl hydrolysis of cellulose and are characterized by being free of groups formed by esterification and oxidation of said cellulose.

4. The process of claim 3 wherein said cellulose is a non-alkali-swollen cellulose.

5. The process of claim 1 wherein said aggregates are mechanically disintegrated.

6. The process of claim 1 wherein said aggregates have a particle size in the range of less than 1 to about 300 microns.

7. The process of claim 1 wherein said mixture is a mixture of amino group-containing components.

8. The process of claim 7 wherein said mixture is a mixture of amino acids.

9. The process of claim 1 wherein said mixture is a mixture of sugars.

10. The process of claim 1 wherein said mixture is a mixture of dyes.

11. The process of claim 1 wherein said mixture is a mixture of unsaturated fatty acids.

12. The process of claim 1 wherein said mixture is an impurity-containing oily material.

References Cited by the Examiner

UNITED STATES PATENTS 2,978,446  4/61  Battista et al. _____ 106—163

OTHER REFERENCES

Hirst et al. and Jones: "Discussions of the Faraday Society," No. 7, 1949, pages 268–274 and 285–296, respectively.

Burstall et al.: "Discussions of the Faraday Society," No. 7, 1949, pages 179–184.

Segal et al.: J. Amer. Chemical Soc., vol. 76, No. 18, September 20, 1954, pages 4626–4630.

MORRIS O. WOLK, *Primary Examiner.*

CARL F. KRAFFT, *Examiner.*